United States Patent Office 3,507,823
Patented Apr. 21, 1970

3,507,823
ART OF PREPARING DYEABLE POLYACRYLO-NITRILE PRODUCTS
Louis E. Trapasso, Westfield, and Charles L. Smart, Millington, N.J., assignors to Celanese Corporation, New York, N.Y., a corporation of Delaware
No Drawing. Filed Mar. 9, 1967, Ser. No. 621,765
Int. Cl. C08f 3/16
U.S. Cl. 260—32.6                    22 Claims

ABSTRACT OF THE DISCLOSURE

Dyeable (especially cationic-dyeable) acrylonitrile (AN) compositions and articles (e.g., films and filaments) are produced from blends of (I) homopolymeric or copolymeric AN containing from ca. 40% up to 100% AN monomer units and (II) a copolymer of (A) a water-soluble salt (e.g., Na or other alkali-metal salt) of vinyl sulfonic acid (VSAS) and (B) at least one dye diffusion-promoting ethylenically-unsaturated monomer (DDP) that is copolymerizable with the VSAS of (A). In the polymeric AN of (I) monomer units other than AN are units of at least one different ethylenically unsaturated monomer that is free from cationic dye sites and is copolymerizable with AN (e.g., the various styrenes, halogenated and nonhalogenated olefins, vinyl and vinylidene halides).

The monomer units of the VSAS in the copolymer of (II) constitute from 0.1 to about 2% of the total number of monomer units making up the copolymer. Examples of the DDP monomers of (B) are the vinyl esters, e.g., vinyl acetate, the acrylic and methacrylic esters, e.g., methyl acrylate and methyl methacrylate, acrylic acid, and the $C_1$–$C_6$ alpha-alkyl-substituted acrylic acids. The acrylic and alkyl-substituted acrylic acids can be either in free acid form or as a water-soluble salt thereof.

Sufficient copolymer of (II) is blended with the polymer of (I) to increase the cationic dye-receptivity of the latter, e.g., from 1% to ca. 25%, preferably from ca. 5% to ca. 15%, based on total polymer.

The components may be dry-blended, but are preferably blended while dissolved in a common solvent, e.g., dimethyl-acetamide. The solutions can be cast to form cationic-dyeable films or wet-spun to form cationic-dyeable filamentary materials and other shaped articles.

---

This invention relates broadly to the art of making dyeable polymers and shaped polymeric articles, and more particularly to techniques whereby polymeric (homopolymeric and copolymeric) acrylonitrile is rendered dyeable with cationic dyes. The invention is based on our discovery that certain copolymers of a water-soluble salt of vinylsulfonic acid are capable of functioning both as a dye site for cationic (basic) dyes and as a dye-diffusion promoter in homopolymeric and copolymeric acrylonitrile and shaped articles made therefrom that have dye-resistant characteristics. The scope of the invention includes composition, article, and method features.

It is known that homopolymeric acrylonitrile and copolymers of acrylonitrile into which no dye sites have been introduced chemically (i.e., as an integral part of the polymer molecule) or by blending with a polymer containing dye sites are extremely difficult to dye satisfactorily with conventional acid and basic dyes. Various and sundry means have been suggested and are in use for overcoming or minimizing the problem of dyeing acrylonitrile polymers effectively and economically without adversely affecting the other useful and/or commercially desirable properties of shaped articles (e.g., films, filaments, etc.) fabricated from the polymer. The present invention is a different solution to the problem of dyeing acrylonitrile homopolymers and copolymers and which has certain advantages over the prior-art techniques.

Accordingly, it is one of the primary objects of the present invention to provide blends of an acrylonitrile polymer (homopolymer or copolymer) having dye-resistant characteristics and a compatible cationic dye-receptive adduct that also functions as a dye-diffusing agent or promoter.

Another object of the invention is to provide cationic dye-receptive compositions, more particularly blends of a dye-resistant acrylonitrile polymer and a compatible dye-receptive copolymer, that can be spun, cast, or otherwise shaped to form filaments (mono- or multifilaments), films, rods, tubes, bars, ribbons, tapes, sheets, yarns tows, and the like, the shaped articles then dyed either before or after having been oriented (e.g., by stretching) and/or made into fabrics in knitted, woven, felted, or other form.

Still other objects of the invention are to provide methods of making the new compositions and shaped articles of the invention.

Other objects of the invention will be apparent to those skilled in the art from the description and examples that follow.

In general, the objects of the invention are attained by incorporating into a polymer of acrylonitrile a copolymer of (a) a polymerizable water-soluble salt (e.g., an alkali-metal salt) of vinylsulfonic acid and (b) a dye diffusion-promoting copolymerizable monomer such, for example, as vinyl esters of saturated aliphatic monocarboxylic acids having not more than about 7 carbon atoms and the lower alkyl (e.g., $C_1$ through $C_6$) esters of acrylic and methacrylic acids. The salt-form of vinylsulfonic acid (VSAS) in the copolymer can be converted in situ to the free acid formed by treatment with a strong acid such as HCl, $H_2SO_4$, trichloroacetic, etc.

More specific examples of dye diffusion-promoting (DDP) monomers that are copolymerizable with a water-soluble salt (including the sodium and other alkali-metal salts of vinyl-sulfonic acid) are vinyl formate, vinyl acetate, vinyl propionate, vinyl butyrate, vinyl isobutyrate, vinyl valerate, vinyl caproate, vinyl heptylate, methyl acrylate and methacrylate, ethyl acrylate and methacrylate, and the propyl through hexyl (both normal and isomeric) acrylates and methacrylates. Other examples are acrylic acid and the $C_1$ through $C_6$ α-alkyl-substituted acrylic acids. These monomers can be either in free acid form or in the form of a water-soluble salt thereof, e.g., an alkali-metal salt, including the sodium and potassium salts thereof.

The proportions of VSAS and DDP in the VSAS–DDP copolymer are such that the VSAS units constitute a relatively small proportion, e.g., from 0.10 to about 2 percent, and more particularly from about 0.5 to about 1.5 percent, of the total number of monomer units making up the VSAS–DDP copolymer. Good results have been obtained when the VSAS units constituted from about 0.25 to about 0.75 percent, and specifically about 0.5 percent, of the total number of monomer units in the aforesaid copolymer. The VSAS–DDP copolymers advantageously are prepared by emulsion-polymerization technique but other methods, such as those hereafter described, also may be employed.

Most conveniently the dye-receptive compositions of the invention are made by blending together predetermined proportions of solutions of the acrylonitrile polymer and of the modifying copolymer and wherein each is either dissolved in the same solvent or in different solvents that are miscible (i.e., compatible) with each other. If the dye-resistant acrylonitrile polymer employed in the blend is a dye-resistant copolymer of acrylonitrile, it may be a binary, ternary or higher multicomponent copolymer.

The acrylonitrile polymer is prepared in known manner, using bulk, solution, suspension or emulsion polymerization techniques, and preferably with the aid of some form of catalytic influence including heat, light, irradiation, catalysts or various combinations thereof as desired or as conditions may require.

Any of the catalysts, especially those of the so-called "free-radical" type, commonly employed in polymerizing compounds containing an ethylenically-unsaturated grouping, specifically a vinyl grouping, can be used. Such catalysts include the various organic and inorganic peroxy compounds, more particularly the organic peroxides, e.g., tert.-butyl hydroperoxide; the salts of inorganic per-acids, e.g., ammonium persulfate, sodium persulfate and potassium persulfate; the azo-type catalysts, e.g., $\alpha,\alpha'$-azodiisobutyronitrile; and the various redox-catalyst systems, e.g., ammonium or potassium persulfate and sodium meta-bisulfite, sodium chlorate and sodium sulfite, as well as others known in the art.

For additional details on polymerization techniques generally applied in preparing the homopolymers and copolymers involved in this invention, reference is made to U.S. Patent No. 3,180,857 of Conciatori and Smart, dated Apr. 27, 1965, and assigned to the same assignee as the present invention, especially column 5, lines 17–73 thereof, and wherein methods for the preparation of certain copolymers of vinylidene cyanide are described.

Illustrative examples of comonomers that may be used in forming copolymers with acrylonitrile and which, in addition to homopolymeric acrylonitrile, constitute acrylonitrile copolymers that can be improved in cationic dye-receptivity by practicing the present invention are the vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, the various poly-substituted styrenes such as, for example, the various di-, tri- and tetra-chlorostyrenes, -bromostyrenes, -fluorostyrenes, -methylstyrenes, -ethylstyrenes, -cyanostyrenes, etc., vinylnaphthalene, vinylcyclohexane, vinylfurane, vinyldibenzofuran, allylbenzene, the various alpha-substituted styrenes and alpha-substituted ring-substituted styrenes, e.g., alpha-methylstyrene, alpha-methyl, para-methylstyrene, etc., vinylbenzoate, and the various vinyl ring-substituted benzoates such as, for example, the various vinyl chloro-, bromo and fluorobenzoates, and the various vinyl alkyl-substituted (methyl-, ethyl-, propyl- and higher alkyl-substituted) benzoates; olefins of the class exemplified by isobutylene, 2-methyl-1-butene, 2-methyl-1-pentene, 2,6-dimethyl-1-octene, 2,3,3-trimethyl-1-butene, and the various butadienes including 1,3-butadiene, 2-chlorobutadiene, etc.; 2-halogenated olefins of the class exemplified by 2-chloroprene, 2-chlorobutene, and 2-fluorobutene; vinyl and vinylidene halides such as vinyl chloride, vinyl bromide, vinylidene chloride, vinylidene fluoride and the like; vinylidene cyanide; and methacrylonitrile, ethacrylonitrile and higher $\alpha$-alkyl-substituted acrylonitriles of the homologous series.

Other examples of many of the foregoing classes of comonomers are set forth generically, and with other species than those mentioned above, in the aforementioned Patent No. 3,180,857, and particularly in column 1, line 26, through line 72 in column 3; and which are described in the said patent as being monomers useful in forming copolymers or interpolymers with vinylidene cyanide.

The ethylenically-unsaturated monomer used in forming a dye-resistant (i.e., cationic dye-resistant) copolymer with acrylonitrile is one that is free from basic dye sites. It can be mono- or poly-unsaturated and terminal or non-terminal ethylenically unsaturated. Preferably the comonomer is mono-unsaturated and, still more preferably, contains a single terminal ethylenically-unsaturated grouping, i.e.,

The comonomer with acrylonitrile may itself be a dye-diffusion promoter. For example, it can be a vinyl ester of a saturated aliphatic monocarboxylic acid, e.g., vinyl acetate; or acrylic or a lower-alkyl alpha-substituted acrylic acid, e.g., methacrylic acid; or a sodium, potassium or other water-soluble salt or a lower-alkyl ester of such acids. More specific examples of such dye-diffusion promoters have been given hereinbefore in the discussion of dye-diffusion promoters useful as comonomers with a polymerizable water-soluble salt of vinylsulfonic acid; and, also, in the aforementioned U.S. Patent No. 3,180,857.

In making acrylonitrile (AN) copolymers it is usually desirable, in order to secure optimum benefit from the presence of AN in the copolymer structure, that the acrylonitrile constitute at least about 85% of the mers or units in the copolymer. The comonomer may constitute any percentage above 85% up to but less than 100%, e.g., up to and including 99.9%. Normally the benefits usually sought by copolymerizing acrylonitrile with a different comonomer are not attained unless the latter constitutes at least 1 or 2%, preferably at least between 3 and 5%, of the total mers in the copolymer. The aforementioned lower limit of 85% AN is subject to further reduction, for example down to about 40% AN, when the desired copolymer is amenable to forming into shaped articles such as those now generically designated as "modacrylic" fibers.

It will be understood, of course, by those skilled in the art that the copolymer employed in making the modacrylic fiber must be fiber-forming (fiber-formable), which necessitates that the comonomer(s) used with the acrylonitrile monomer must be so chosen and employed in such an amount that the resulting copolymer is a fiber-forming copolymer.

In producing the blended compositions of this invention, the cationic dye-resistant polymer (i.e., a homopolymer of acrylonitrile and/or an acrylonitrile copolymer such as those described hereinbefore) and the copolymer of (a) a vinyl sulfonic acid salt (VSAS) and a copolymerizable dye-diffusion promoter (DDP) are blended together in proportions such that the latter imparts cationic dye-receptivity to the former, the net result being that the blended product becomes cationic dye-receptive.

The proportions of the respective components of the bland may be varied widely, but generally the VSAS–DDP copolymer constitutes, by weight, from 1% to about 25%, more particularly from 2 to 3% to about 20%, and preferably from about 5% to about 15%, of the total amount of the dye-resistant polymer (i.e., homopolymeric or copolymeric acrylonitrile) and the VSAS–DDP copolymer.

In general, the higher amounts of the VSAS–DDP copolymer are employed in the blend when the dye-resistant polymer is (a) a homopolymer (e.g., homopolymeric acrylonitrile) or (b) a copolymer containing a minor amount (e.g., less than about 5 weight percent) of one or more components that are either 1) less dye-resistant per se than is the main component or (2) function as a dye-diffusion promoter. An example of the latter type of copolymer is a copolymer of acrylonitrile and from 0.1% to less than about 5% (e.g., 4.5%) of methyl acrylate or vinyl acetate, these percentages being by weight and based on the monomeric charge. In other words, the less that the copolymer is cationic dye-resistant (i.e., the more the copolymer is cationic dye-receptive), the less is the amount of VSAS–DDP copolymer that is incorporated into the blend.

Any suitable method of blending the VSAS–DDP copolymer and the dye-resistant polymer to form a substantially homogeneous composition may be employed. For example, the finely divided solids may be dry-blended together using commercially available mixing equipment, or they may be dissolved in a common solvent and admixed in solution (including dispersed) state. Usually the latter method is preferred. The solvent should be one in which both the polymeric acrylonitrile and the VSAS–DDP copolymer are soluble (substantially soluble) at least at the application temperature, more particularly at the extrusion temperature when the solution is to be extruded through an opening to form filaments, films, or the like. To the best of our knowledge and belief any solvent for polymeric acrylonitrile will also function as a solvent for the VSAS–DDP copolymer, or at least will provide such a fine state of dispersion of the said copolymer in the solution of the acrylonitrile polymer that the thusly modified solution will be useable for its intended purpose.

Suitable solvents, more particularly organic solvents, for making solution blends of the VSAS–DDP copolymer and the polymeric acrylonitrile are disclosed in U.S. Patents 2,404,713–728 directed to organic-solvent solutions of homopolymeric acrylonitrile and copolymers of at least 85% by weight of acrylonitrile with another monomer, and to the use of such solutions in making films, filamentary materials, and the like. Specific examples of organic solvents that may be employed in making such blends are dimethylformamide, N,N-dimethylacetamide (DMA), dimethylsulfoxide, dimethylsulfone, ethylene thiocyanate, trimethylene thiocyanate, ethylene carbonate and propylene carbonate.

In the preferred technique for effecting solution blending, the VSAS–DDP copolymer is added to a solution of the polymeric acrylonitrile. The dissolution of the acrylonitrile polymer in the solvent, more particularly an organic solvent, is accelerated by using a polymer that is in finely divided state, e.g., one which, if not in finely divided state as originally formed, has been ground so that all or substantially all of it will pass through a U.S. Standard sieve series No. 50 screen. It is also usually desirable to agitate the mass, by mechanical stirring, while dissolving the polymer in the solvent. To avoid or minimize discoloration of the acrylonitrile polymer, it is also desirable to employ the lowest possible temperature in effecting dissolution thereof that is consistent with practical considerations, e.g., the time required for effecting solution, etc. Dissolution temperatures below about 100° C. are advantageous, and preferably the maximum temperature of dissolution is kept within the range of 60°–90° C. providing the solvent is a liquid at that temperature; otherwise, at the lowest maximum temperature that will liquify the solvent and maintain it in liquid state.

After adding the VSAS–DDP copolymer to the dissolved acrylonitrile polymer, agitation and heating as described above are continued until a substantially homogeneous liquid composition or blend has been obtained.

The proportions of the blended solids (i.e., VSAS–DDP copolymer plus dye-resistant acrylonitrile polymer) are generally such that the solution contains from about 5 to about 35, and preferably from about 10 to about 25 or 30 weight percent of the aforementioned solid components of the blend. Solids concentrations within this more limited range, especially at the higher limits of the range, are particularly desirable when the modified polymeric composition of this invention is to be used in the spinning of filaments or in the casting of films. Good results have been obtained when the aforesaid modified polymeric composition constituted about 20% by weight of the solution.

As will be readily understood by those skilled in the art, the aforementioned ranges of concentration are mentioned as indicative of concentrations that may be employed, and the invention obviously is not limited to the use of only such concentrations. Especially in spinning and casting applications of the compositions, the important factor is that the concentration of the above-described polymeric components in the solvent be such that the viscosity of the liquid composition at the operating temperature is within a workable range.

Satisfactory viscosities at the usual operating temperatures generally prevail when the total polymeric solids (i.e., VSAS–DDP copolymer plus acrylonitrile polymer) in the solution constitute from about 10 to about 25 or 30 weight percent of the solvent (particularly organic-solvent) solution thereof. However, this is dependent upon various influencing factors such as the relative proportions of VSAS–DDP copolymer and polymeric acrylonitrile in the solution, and the particular molecular weight of the aforesaid copolymer. (The average molecular weight of the VSAS–DDP copolymer may be within the range of from about 1000 to about 10,000, but generally is substantially above 10,000, and preferably is of the same general order as that of the acrylonitrile polymer.) A greater influencing factor in determining the concentration of solids in the solution is probably the average molecular weight of the acrylonitrile polymer prior to modification thereof with the VSAS–DDP copolymer.

The average molecular weight of the homopolymeric or copolymeric acrylonitrile usually exceeds about 10,000, advantageously exceeds about 20,000, and preferably is within the range of from 40,000 or 50,000 to 150,000 or 200,000, or even 250,000 or 300,000 or more, as determined from viscosity measurements and calculations by the Staudinger equation. For some applications it may sometimes be desirable to prepare and use an acrylonitrile polymer having a molecular weight of even 500,000 or 1,000,000 or more (Staudinger method; reference: U.S. Patent No. 2,404,713).

The inherent viscosity (I.V.) of the solution of dye-resistant acrylonitrile polymer modified with the VSAS–DDP copolymer of the kind used in practicing this invention is at least 0.5, advantageously from about 1 to about 3, and preferably from about 1.0 to about 2.0 as measured in a 0.1 weight percent concentration of the modified polymer composition in DMF at 25° C.

Because the use of the higher amounts of solvent renders spinning operations more costly and difficult due to the trouble often encountered in rapidly removing large amounts of solvents from the solution and due to the cost of such removal, it is preferable to use a modified polymeric composition wherein the initially dye-resistant polymeric acrylonitrile component thereof has a molecular weight such that a maximum amount of the AN polymer, consistant with the viscosity of the solution at the operating temperature, can be dissolved in the chosen solvent, e.g., an organic solvent such as DMF, DMA, dimethylsulfoxide (DMS), and the like. By using, for example, an acrylonitrile polymer having an average molecular weight (Staudinger method) within the range of from about 40,000 or 45,000 up to about 150,000 or 160,000, it is possible to obtain solutions containing, for instance, from 7 or 8% to 25–30% by weight of the VSAS–DDP copolymer-modified AN polymer, and having suitable viscosities for use at operating temperatures of the order of, for example, 70° C. to 150° C.

The above-described solutions of the VSAS–DDP copolymer-modified AN polymeric compositions may be used in the production of various fabricated articles or structures such as, for example, films, filaments, bars, rods, tubes, etc., in accordance with general techniques now well known to those skilled in the art, the detailed operating conditions being suitably modified where required. Such technique usually involves extruding the solution containing the polymeric acrylonitrile modified with the VSAS–DDP copolymer through an opening of predetermined cross-section into a liquid non-solvent for the said modified polymer thereby to form a shaped article.

Describing the method of making shaped articles from the solutions (liquid compositions) of this invention more specifically, it may be stated that, in one method of making extruded articles, the solution (advantageously heated to, for instance, 70°–130° C. after having been previously deaerated and filtered) is extruded through a spinneret or die into a liquid nonsolvent that will coagulate the polymeric solids components of the extrudable composition, more particularly spinning solution. The liquid into which the spinning solution is extruded is one which is miscible with the organic or other solvent component of the solution and which, as a result of extracting the solvent, is capable of coagulating the dissolved polymeric solids. Any liquid which is thus capable of coagulating the aforesaid polymeric solids may be employed, but preferably the liquid coagulant is one that has no harmful effect upon the blended components of the polymeric composition.

Thus, when the solvent component of the spinning solution is an organic solvent such as, for example, dimethylacetamide (DMA), the liquid coagulant may be, for instance, water or almost any aqueous salt solution, e.g., the alkali-metal (specifically the sodium and potassium) and the ammonium chlorides, bromides, sulfates, nitrates, phosphates, acetates and propionates, as well as water-soluble salts of divalent and trivalent cations, e.g., zinc chloride, calcium chloride, calcium thiocyanate, and their obvious equivalents.

The liquid coagulant that is suitable for use with a particular solvent solution of the copolymer-modified AN polymeric material is readily ascertained by checking the literature or by simple experimentation as to those compounds or substances in which the chosen solvent (e.g., organic solvent, component of the spinning solution is soluble at a suitable, operating bath temperature and in which the copolymer-modified AN polymeric material that is a component of the spinning solution is sufficiently insoluble to permit coagulation thereof in a relatively short period of time.

The temperature of the coagulating or precipitating bath may be varied as desired or as conditions may require depending upon the chosen organic or other solvent component of the spinning solution and the chosen liquid coagulant. Generally, the coagulating bath temperature is within the range of from about 0°–10° C. to about 100° C., and is preferably not higher than about 70° or 80° C. in order to minimize discoloration of the coagulated, modified AN polymeric material.

It will be understood, of course, by those skilled in the art that the temperature of the liquid coagulating bath (sometimes called a "spin" bath) should be such as to dissolve the solvent from the extruded mass most rapidly and effectively. The length of travel of the shaped article through the bath may be varied as desired or as may be required by the other particular operating conditions. However, in all cases the length of travel should be sufficient to effect solidification of the copolymer-modified AN polymeric material and to extract from the extruded mass substantially all of the solvent; or, if desired, only a part of the solvent so that, for example, from 0.5 or 1% to 15 or 20% or more, by weight of the whole, remains in the extruded mass as a fugitive or permanent plasticizer of the aforesaid copolymer-modified AN polymeric material.

The spun filamentary material or other extruded article is preferably treated in, or after leaving, the coagulating bath in order to orient the molecules along the fiber axis and thereby to increase the tensile strength and otherwise improve the properties of the spun material. Orientation may be effected by stretching the thread or strand at any suitable stage of the spinning operation but preferably while the spun filament or thread still contains at least some of the solvent. Stretching may be accomplished by passing the thread or yarn between two or more positively driven rolls or godets, the peripheral speeds of which are adjusted so that the thread, yarn, tow, or the like is stretched to the desired degree.

The amount of stretch that is applied to the filamentary material may be varied widely, but in all cases should be sufficient to cause at least appreciable orientation of the molecules along the fiber axis and an improvement in the properties of the material undergoing treatment. The amount of tension to which the filamentary material is subjected should not be so great as to cause it to break (i.e., appreciable or substantial breakage of the individual filaments of the strand or yarn). Depending, for example, upon the type or kind of material being stretched and the particular properties desired in the finished product, the amount of stretch may vary, for instance, from 100%, preferably from 200 or 300%, up to 600 or 700%, or more of the original length of the filamentary material.

The stretch may be applied gradually by passing the strand or the like over a plurality of godets having increasing peripheral speeds. The stretched filamentary material may be wound upon a spool or it may be collected in a centrifugal pot, whereby twist advantageously is applied to the filamentary bundle. Alternatively, the stretched filamentary material may be led over a thread-storage device on which it may be treated with a suitable solvent to remove all or part of the coagulant and/or organic (or aqueous inorganic) solvent component of the spinning solution that may not previously have been removed, after which it may be continuously dried, oiled and taken up on a twisting device, such, for instance, as a ring-twisting spindle.

The extruded filamentary material may be given part or all of its total stretch in a liquid medium such as that which constitutes the coagulating bath, or in any other suitable medium, and at a suitable temperature. Thus, the stretch may be applied while the yarn or the like is being passed through a gaseous medium, e.g., air, nitrogen, flue gases, etc., or through a liquid medium, e.g., water, or such media as are employed for coagulating the VSAS–DDP copolymer-modified AN polymeric component of the spinning solution. To obviate or minimize discoloration of the said polymeric component, the temperature of the medium in which the filamentary material is stretched and its rate of travel therethrough should be adjusted so that overheating of the material does not occur. Ordinarily the temperature of the medium in which stretching is effected is below 200° C., e.g., at 70° to 140° C.

The highly stretched product is strong, tough and pliable, and shows a high degree of orientation along the fiber axis by X-ray diffraction.

Instead of forming a shaped article such as filamentary material by a wet-spinning method as previously has been described, the filamentary material may be produced by dry-spinning technique. This technique is more fully described and illustrated by specific examples directed to dry-spinning of organic-solvent solutions of homopolymeric acrylonitrile and copolymers of acrylonitrile, different from those with which this invention is concerned, in U.S. patents included in the previously mentioned patent group, viz., 2,404,713–728.

The solvent solutions of the VSAS–DDP copolymer-modified AN polymers, specifically acrylonitrile polymers, with which this invention is concerned also can be cast in the form of films. For instance, the hot liquid composition may be cast upon a revolving drum which is partly immersed in a coagulating bath, such as mentioned hereinbefore, and which will serve to deposit the aforesaid modified polymer as a thin film on the drum as it passes through the bath. The resulting film may be stretched, if desired, lengthwise and crosswise by suitable, commercially available apparatus to improve its properties.

The cationic dye-receptive polymers with which this invention is concerned may be dyed with a basic dye while they are still in unshaped form; or, they may first be shaped, e.g., in the form of filamentary materials which are subsequently dyed either before or after they have been made into fabrics, clothing and the like.

One of the main advantages accruing from the use of a VSAS–DDP copolymer of the kind with which this invention is concerned in imparting cationic dye-receptivity to cationic dye-resistant homopolymeric or copolymeric acrylonitrile, is that it is capable of functioning both as a source of dye sites and as a dye-diffusion promoter. Consequently, if desired, one can eliminate the introduction or reduce the amount of such a promoter by copolymerizing, as heretobefore has been the common practice, (a) acrylonitrile and the like that alone yield dye-resistant polymers with (b) a comonomer which, as an integral part of the copolymer molecule, is capable of functioning as a dye-diffusion promoter.

In order that those skilled in the art may better understand how the present invention can be carried into effect, the following examples are given by way of illustration and not by way of limitation. All parts and percentages are by weight unless otherwise stated.

EXAMPLE 1

Copolymer of vinyl acetate and sodium vinyl sulfonate

The above-identified copolymer is prepared by emulsion copolymerization of the specified monomers, using a delayed addition of monomers and initiator (catalyst).

Five (5) parts of potassium persulfate and 2.5 parts of sodium vinyl sulfonate are dissolved together in 500 ml. water in a dropping funnel. The resulting solution and 500 g. of vinyl acetate (VA) monomer are added to a stirred reaction vessel containing 200 ml. water (maintained at 70° C. by thermostatic control) over a period of two hours. The reaction mass is heated for an additional ½ hour after all the feed has been charged to the vessel, and then cooled while stirring. A very coarse, aqueous suspension of copolymer solids (25%) is obtained. The product, a copolymer of about 99.5% VA and about 0.5% sodium vinyl sulfonate (based on charge), is collected by suction filtration, followed by drying in a vacuum oven at 35° C. for about 16 hours. The yield of dried product is about 53.7%.

In a similar manner copolymers of VA and sodium vinyl sulfonate are made in proportions such that the percentages of the latter, based on total monomers charged, are approximately as follows: 0.1, 0.15, 0.25, 0.75, 1.0, and 2.0%; also, copolymers of sodium vinyl sulfonate in these approximate percentages (also 0.5%), on the same basis just mentioned, with other dye-diffusion promoters, specifically acrylic and methacrylic acids charged in the form of their sodium salts, methyl acrylate, ethyl acrylate, and methyl methacrylate.

EXAMPLE 2

This example illustrates the use of modifying sodium vinyl sulfonate copolymers of the kind described in Example 1 in improving the cationic dye-receptivity of a copolymer of acrylonitrile (AN) and methyl acrylate (MA) having an inherent viscosity of 1.28. It is prepared by the emulsion copolymerization of these monomers wherein the proportions of monomers in the charge are 92.7% AN and 7.3% MA. Copolymerization is effected at 45° C. using sodium lauryl sulfate as a surfactant in an aqueous surfactant solution acidified with sulfuric acid, and a redox-catalyst system consisting of potassium persulfate and sodium metabisulfite. In the binary copolymer that is thereby produced the proportions of the units or mers of the individual starting monomers are of the same general order as those of the charge.

In making the test the modifying sodium vinyl sulfonate copolymer is used in the ratio of 5 parts by weight of the said copolymer to 95 parts by weight of the above-described AN–MA copolymer, calculated on a net-dry solids basis. The blends are made in solution state as follows:

A sample of the dry, white, powdery AN–MA copolymer is dissolved with agitation and heating at about 75° C. in dimethylacetamide (N,N-dimethylacetamide) in an amount such as will provide a solution containing 19% of the AN–MA copolymer solids. To individual portions of 119 grams each of the resulting solution there is added 2.5 grams (10% of the total copolymer solids) of sodium vinyl sulfonate copolymers of the kind described in Example 1, e.g., a copolymer of VA and sodium vinyl sulfonate. Heating and stirring of the solutions containing the AN–MA copolymer and the modifying sodium vinyl sulfonate copolymer with a polymerizable dye-diffusion promoter are continued until substantially homogeneous compositions have been obtained. The maximum temperature of heating with agitation is about 95° C.

Films, about 10 to 15 mils thick, of the solution of the control sample (i.e., the above-described, unmodified NA–MA copolymer) and of the test specimen, i.e., a solution of the control AN–MA copolymer modified with 10% by weight of a copolymer of vinyl acetate and sodium vinyl sulfonate containing about 0.5% (based on charge) by weight of the latter, are cast on glass plates. These films are dried in a vacuum oven at a temperature of about 60° C. for about 16 hours. The films are stripped from the substrate. The films of both the control and of the test specimens are clear. They are dyed in a Sevron Blue B (Basic Blue, Colour Index Number 21) dye bath containing the following ingredients:

Distilled water—1800 ml.
Sevron Blue B, a cationic dye—0.90 g.
Triton® X–102[1] (surfactant)—0.90 g.
Sodium acetate—0.30 g.
Glacial acetic acid—0.6 ml.
Latyl® carrier A[2]—9.00 g.

[1] Triton is a registered trademark of Rohm and Haas Company, Philadelphia, Pa. It is octylphenoxy(polyethoxy)-ethanol containing about 10 moles of combined ethylene oxide.
[2] Latyl is a registered trademark of E. I. du Pont de Nemours and Company, Wilmington, Del. Latyl carrier A is understood to be a mixture of dimethyl terephthalate and benzanilide.

The films are treated in the hot dye solution for 1 hour at 97° C., then rinsed in a 1% green soap solution for another hour at 72° C.

The film of the control sample is only faintly stained upon dyeing. In marked contrast, the film of the test sample is dyed to a very deep shade of blue. Furthermore, it remains dark blue in color after washing at 72° C. in a 1% green soap solution.

EXAMPLE 3

Example 1 is repeated exactly with the exception that in this case 100% homopolymeric acrylonitrile is employed, and the amounts of said homopolymer and of the modifying vinyl acetate copolymer containing 0.5% (based on charge) of sodium vinyl sulfonate are such as to provide a solution of dimethylacetamide (DMA) containing 10% of total copolymer solids.

The film of the control sample (homopolymeric acrylonitrile) is unstained. In marked contrast, the film of the test sample is dyed a very dark blue and remains dark blue in color after washing at 72° C. in a 1% green soap solution.

The individual solutions of the modified copolymeric acrylonitrile on Example 1 and the modified homopolymeric acrylonitrile of Example 2 can be wet-spun into 3-denier filaments following the general procedure described in U.S. Patent No. 2,615,866. These solutions also can be dry-spun using the apparatus and following the procedure illustrated in Example 6 of U.S. Patent No. 2,821,521. Both the wet-spun and the dry-spun filamentary materials are dyeable to deep shades with a basic dye.

EXAMPLE 4

Same as in Example 2 with the exception that the acrylonitrile copolymer is a copolymer of 92.7% AN and 7.3% VA (based on charge) and the modifying, dye-receptive copolymer is a copolymer of about 99.5% MA and about 0.5% sodium vinyl sulfonate (also based on charge).

As in Example 2, the film of the control sample (unmodified copolymer of AN and VA) is only faintly stained upon dyeing, while the test specimen (AN-VA copolymer modified with the aforementioned dye-receptive copolymer) is dyed a very dark blue, and remains dark blue in color after washing at 72° C. in a 1% green soap solution.

EXAMPLE 5

Example 2 is repeated except that instead of a copolymer of VA and sodium vinyl sulfonate, containing about 0.5% (based on charge) by weight of the latter, as the dye-receptive modifying copolymer there are employed in individual formulations, as dye-receptive modifiers of the primary AN-MA copolymer, vinyl acetate copolymers wherein the sodium vinyl sulfonate constitutes (a) 0.1, (b) 0.15, (c) 0.25, (d) 0.75, (e) 1.0, and (f) 2.0 percents by weight of the total monomers charged.

Films are cast from DMA solutions of a control sample (unmodified AN-MA copolymer) and of blends of the primary and modifying dye-receptive copolymers wherein the latter is 5% of the total copolymer solids on a net-dry basis. These films are cast, dried and dyed with a cationic dye as in Example 2.

The film of the control sample is only faintly stained with dye, while modifying dye-receptive copolymers (a) and (b) provide dyed films which show distinctly blue colorations (with little, if any, appreciable difference in the depth of color between them). In general, the intensity of the blue color of the dyed films increases as the amount of the sodium vinyl sulfonate in the modifying dye-receptive copolymer is increased, but seems to "level off" at the higher concentrations. No perceptible difference is noted between the very dark blue shades of the dyed films provided by dye-receptive copolymers (e) and (f); and there is very little, if any, difference between these dyed films and that secured by using dye-receptive copolymer (d), containing 0.75% sodium vinyl sulfonate, as the modifying copolymer.

Instead of using methyl acrylate or vinyl acetate, as a comonomer in making acrylonitrile copolymers, the cationic dye-receptivity of which is increased in accordance with the present invention, one can use styrene, methylstyrene, methacrylonitrile, methyl methacrylate or any other ethylenically (usually monoethylenically) unsaturated monomer that is free from dye sites and which is copolymerizable with acrylonitrile. Numerous examples of such monomers have been given hereinbefore and in the cited art.

The cationic dye-receptive compositions or blends of this invention may be modified (for example, when they are to be shaped to form filaments, films, and the like) by incorporating therein any of the additives or modifiers commonly incorporated into such products. Such additives include U.V. absorbers, antioxidants, stabilizers, pigments, plasticizers, fillers, delusterants, e.g., $TiO_2$, and flame retardants. More specific examples of the latter are, for instance, polyvinyl chloride and bromide, and polyvinylidene chloride and bromide (especially the chlorides), and which may constitute from 10 to 20 percent by weight of the composition (solids basis). When such flame retardants are employed, then stabilizers for them also are usually included, e.g., organic tin salts such as dibutyl tin laurate. The compositions also may contain auxiliary flame retarders, e.g., $Sb_2O_3$, which can function both as a flame retardant and as a delusterant.

It is to be understood that the foregoing detailed description is given merely by way of illustration and that many variations may be made therein without departing from the spirit and scope of the invention.

The embodiments of the invention in which an exclusive property or privilege is claimed are defined as follows:

1. A composition of matter comprising a blend of
(I) an acrylonitrile polymer containing from about 40% up to 100% of acrylonitrile monomer units, any remaining units being units of at least one different ethylenically-unsaturated monomer that is free from cationic dye sites and is copolymerizable with acrylonitrile, and
(II) a copolymer of (A) a water soluble salt of vinylsulfonic acid and (B) at least one dye diffusion-promoting ethylenically-unsaturated monomer that is copolymerizable with the water-soluble salt of (A), the monomer units of the water-soluble salt of vinylsulfonic acid constituting from 0.1 to about 2 percent of the total number of monomer units making up the copolymer, the amount of the copolymer of (II) that is blended with the polymer of (I) being sufficient to increase the cationic dye-receptivity of the acrylonitrile polymer of (I) and wherein the amount of the copolymer of (II) that is blended with the copolymer of (I) is within the range of about up to 25% by weight of the total amount of (I) and (II).

2. A composition as in claim 1 wherein the acrylonitrile polymer contains at least about 85% of acrylonitrile monomer units and the water-soluble salt of vinylsulfonic acid is an alkali-metal salt of the said acid.

3. A composition as in claim 2 wherein the alkali-metal salt of vinylsulfonic acid is sodium vinyl sulfonate in an amount such that it constitutes from 0.25 to about 2 percent of the total number of monomer units making up the copolymer of (II).

4. A composition as in claim 1 wherein the acrylonitrile polymer is homopolymeric acrylonitrile, and the water-soluble salt of vinylsulfonic acid is an alkali-metal salt of the said acid.

5. A composition as in claim 1 wherein the amount of the copolymer of (II) that is blended with the copolymer of (I) is within the range of from 1% to about 25% by weight of the total amount of (I) and (II).

6. A composition as in claim 2 wherein the acrylonitrile polymer of (I) is an acrylonitrile copolymer containing from about 85% up to but less than 100% acrylonitrile monomer units, the remaining monomer units being units of at least one different monomer with terminal monoethylenic unsaturation; and the alkali-metal salt of vinylsulfonic acid constitutes from 0.25 to about 2 percent of the total number of monomer units making up the copolymer of (II).

7. A composition as in claim 2 wherein the dye diffusion-promoting monomer of (B) of the copolymer of (II) is selected from the group consisting of (a) vinyl esters of saturated aliphatic monocarboxylic acids having not more than about 7 carbon atoms, (b) the lower alkyl esters of acrylic and methacrylic acids, and (c) acrylic acid and the $C_1$ through $C_6$ alpha-alkyl-substituted acrylic acids.

8. A composition as in claim 7 wherein the alkali-metal salt of vinylsulfonic acid is sodium vinyl sulfonate in an amount such that it constitutes from about 0.5 to about 1.5 percent of the total number of monomer units making up the copolymer of (II); and the copolymer of (II) constitutes from 1% to about 25% of the total amount of (I) and (II).

9. A composition as in claim 8 wherein the dye diffusion-promoting monomer of (B) of the copolymer of (II) is a vinyl ester of a saturated aliphatic monocarboxylic acid having not more than about 7 carbon atoms.

10. A composition as in claim 9 wherein the vinyl ester is vinyl acetate.

11. A composition as in claim 8 wherein the dye diffusion-promoting monomer of (B) of the copolymer of (II) is a lower alkyl ester of acrylic acid.

12. A composition as in claim 11 wherein the lower alkyl ester of acrylic acid is methyl acrylate.

13. A composition as in claim 6 wherein the acrylonitrile polymer of (I) is an acrylonitrile copolymer wherein monomer units of methyl acrylate constitute from about 3 to about 10 percent of the total monomer units, and acrylonitrile monomer units constitute the remainder; and the dye diffusion-promoting monomer of (B) of the copolymer of (II) is vinyl acetate.

14. A composition as in claim 6 wherein the acrylonitrile polymer of (I) is an acrylonitrile copolymer wherein monomer units of vinyl acetate constitute from about 3 to about 10% of the total monomer units, and acrylonitrile monomer units constitute the remainder; and the dye diffusion-promoting monomer of (B) of the copolymer of (II) is methyl acrylate.

15. The composition of claim 1 dissolved in a solvent therefor.

16. The composition of claim 1 in the form of a shaped article.

17. The shaped article of claim 16 dyed with a cationic dye.

18. The composition of claim 2 in the form of filamentary material.

19. The composition of claim 2 in the form of a film.

20. A solution of the composition of claim 8 dissolved in an organic solvent in a concentration of from about 5% to about 35% by weight of the solution, said solution being adapted to be wet-formed into a cationic, dye-receptive shaped article.

21. A solution as in claim 20 wherein the organic solvent is N,N-dimethylacetamide.

22. The process which comprises preparing a solution as defined in claim 20, and extruding the said solution through an opening of predetermined cross section into a liquid non-solvent for the solid composition contained in the said solution thereby to form a shaped article.

References Cited

UNITED STATES PATENTS

| | | | |
|---|---|---|---|
| 2,300,920 | 11/1942 | Heuer | 260—79.3 |
| 2,671,072 | 3/1954 | Ham | 260—898 |
| 2,732,363 | 1/1956 | Coover | 260—898 |
| 2,769,793 | 11/1956 | Ham | 260—898 |
| 3,328,333 | 6/1967 | Dannelly. | |

MORRIS LIEBMAN, Primary Examiner

P. R. MICHL, Assistant Examiner

U.S. Cl. X.R.

260—898